(12) United States Patent
Hunt

(10) Patent No.: US 9,646,141 B2
(45) Date of Patent: May 9, 2017

(54) FAST START OF STREAMING DIGITAL MEDIA PLAYBACK WITH DEFERRED LICENSE RETRIEVAL

(75) Inventor: Neil D. Hunt, Los Altos, CA (US)

(73) Assignee: NETFLIX, Inc., Los Gatos, CA (US)

( * ) Notice: Subject to any disclaimer, the term of this patent is extended or adjusted under 35 U.S.C. 154(b) by 844 days.

(21) Appl. No.: 13/166,693

(22) Filed: Jun. 22, 2011

(65) Prior Publication Data

US 2012/0331167 A1    Dec. 27, 2012

(51) Int. Cl.
| | |
|---|---|
| *G06F 21/10* | (2013.01) |
| *H04N 21/254* | (2011.01) |
| *H04N 21/2343* | (2011.01) |
| *H04N 21/438* | (2011.01) |
| *H04N 21/472* | (2011.01) |
| *H04N 21/8355* | (2011.01) |

(52) U.S. Cl.
CPC ....... *G06F 21/10* (2013.01); *H04N 21/23439* (2013.01); *H04N 21/2541* (2013.01); *H04N 21/4384* (2013.01); *H04N 21/47202* (2013.01); *H04N 21/8355* (2013.01)

(58) Field of Classification Search
CPC  G06F 21/10; H04N 21/2541; H04N 21/4384; H04N 21/47202; H04N 21/8355
See application file for complete search history.

(56) References Cited

U.S. PATENT DOCUMENTS

| | | | | |
|---|---|---|---|---|
| 6,671,879 | B1 * | 12/2003 | Schlarb et al. | 725/8 |
| 6,763,392 | B1 * | 7/2004 | del Val et al. | 709/231 |
| 6,771,703 | B1 * | 8/2004 | Oguz et al. | 375/240.03 |
| 7,810,647 | B2 * | 10/2010 | Ganesan et al. | 209/203 |
| 2003/0065802 | A1 * | 4/2003 | Vitikainen et al. | 709/231 |
| 2003/0135867 | A1 * | 7/2003 | Guedalia | 725/126 |
| 2004/0049793 | A1 | 3/2004 | Chou | |
| 2004/0109677 | A1 * | 6/2004 | Seo et al. | 386/95 |
| 2004/0181667 | A1 | 9/2004 | Venters et al. | |
| 2004/0193544 | A1 * | 9/2004 | Varadarajan et al. | 705/59 |
| 2005/0080846 | A1 * | 4/2005 | McCleskey et al. | 709/202 |
| 2005/0117580 | A1 * | 6/2005 | del Val et al. | 370/395.2 |
| 2005/0172154 | A1 | 8/2005 | Short et al. | |
| 2005/0276416 | A1 | 12/2005 | Zhu et al. | |

(Continued)

FOREIGN PATENT DOCUMENTS

WO    03/055219 A2    7/2003

OTHER PUBLICATIONS

Extended European Search Report for EP 12 80 2141, dated Nov. 12, 2014.

*Primary Examiner* — Joe Chacko
(74) *Attorney, Agent, or Firm* — Artegis Law Group, LLP

(57) ABSTRACT

One embodiment of the present invention sets forth a technique for deferring license retrieval when streaming digital media content. The perceived delay between the time a user selects the protected digital media content to when playback of the protected digital media content begins is reduced because retrieval and playback of an unprotected version of a portion of the digital media content starts before the license and protected version of the digital media content is received. The unprotected version includes fast start streams of audio and video data that may encoded at a lower bit rate than the protected version in order to quickly transfer the fast start streams from the content server to the playback device.

22 Claims, 6 Drawing Sheets

(56) References Cited

U.S. PATENT DOCUMENTS

| | | |
|---|---|---|
| 2006/0059090 A1 | 3/2006 | Lahtinen et al. |
| 2006/0271983 A1* | 11/2006 | Katayama et al. ........... 725/100 |
| 2009/0265278 A1* | 10/2009 | Wang et al. ................... 705/54 |
| 2010/0161825 A1* | 6/2010 | Ronca et al. ................. 709/231 |
| 2011/0080940 A1* | 4/2011 | Bocharov et al. ....... 375/240.01 |
| 2011/0138486 A1* | 6/2011 | White ............................ 726/30 |

* cited by examiner

FAST START OF STREAMING DIGITAL MEDIA PLAYBACK WITH DEFERRED LICENSE RETRIEVAL

BACKGROUND OF THE INVENTION

Field of the Invention

Embodiments of the present invention relate generally to digital media and, more specifically, to a fast start of streaming digital media content with deferred license retrieval.

Description of the Related Art

Digital media content distribution systems conventionally include a content server, a content player, and a communications network connecting the content server to the content player. The content server is configured to store digital media content files, which can be downloaded from the content server to the content player. Each digital media content file corresponds to a specific identifying title, such as "Gone with the Wind," which is familiar to a user. The digital media content file typically includes sequential content data, organized according to playback chronology, and may comprise audio data, video data, or a combination thereof.

The content player is configured to download and play a digital media content file, in response to a user request selecting the title for playback. The process of playing the digital media content file includes decoding audio and video data into a synchronized audio signal and video signal, which may drive a display system having a speaker subsystem and a video subsystem. Playback typically involves a technique known in the art as "streaming," whereby the content server sequentially transmits the digital media content file to the content player, and the content player plays the digital media content file while content data is received that comprises the digital media content file.

When a user initiates playback of the digital media content for a digital media content title that is protected, there is a delay before the playback of the selected digital media content begins. The delay is a result of the time needed for the content player to request the selected digital media content and for the content server to locate and transmit the protected digital media content file and the license needed for playback of the protected digital media content file to the content player. For example, a license for DRM (Digital Rights Management) encryption of the digital media content title must be retrieved before starting playback of the protected digital media content files, so that the digital media content that is retrieved is protected. Additionally, a minimum amount of video data must be received by the content player before decoding of the video data can begin. Playback of the video data may only begin after a full GOP (group of pictures) has been received and decoded.

As the foregoing illustrates, what is needed in the art is improved techniques that minimize the perceived delay between the time a user selects the digital media content to when playback of the protected digital media content begins.

SUMMARY OF THE INVENTION

One embodiment of the present invention sets forth a method for a fast start of streaming digital media content with deferred license retrieval. The method comprises the steps of receiving a playback selection for a digital media content title and retrieving one or more intervals of fast start data stream comprising a sequence of intervals encoding an unprotected portion of data of the digital media content title. The license for the digital media content title is requested that authorizes playback of a protected data stream comprising a sequence of intervals encoding protected data of the digital media content title. At least one of the one or more intervals of the fast start data stream are played before the license for the digital media content title is acquired.

One advantage of the disclosed technique is that the perceived delay between the time a user selects the protected digital media content to when playback of the protected digital media content begins is reduced because playback of an unprotected version of a portion of the digital media content starts before the license and protected version of the digital media content is received. The unprotected version of a portion of the digital media content includes fast start streams of audio and video data that may encoded at a lower bit rate than the protected version in order to quickly transfer the fast start streams from the content server to the playback device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
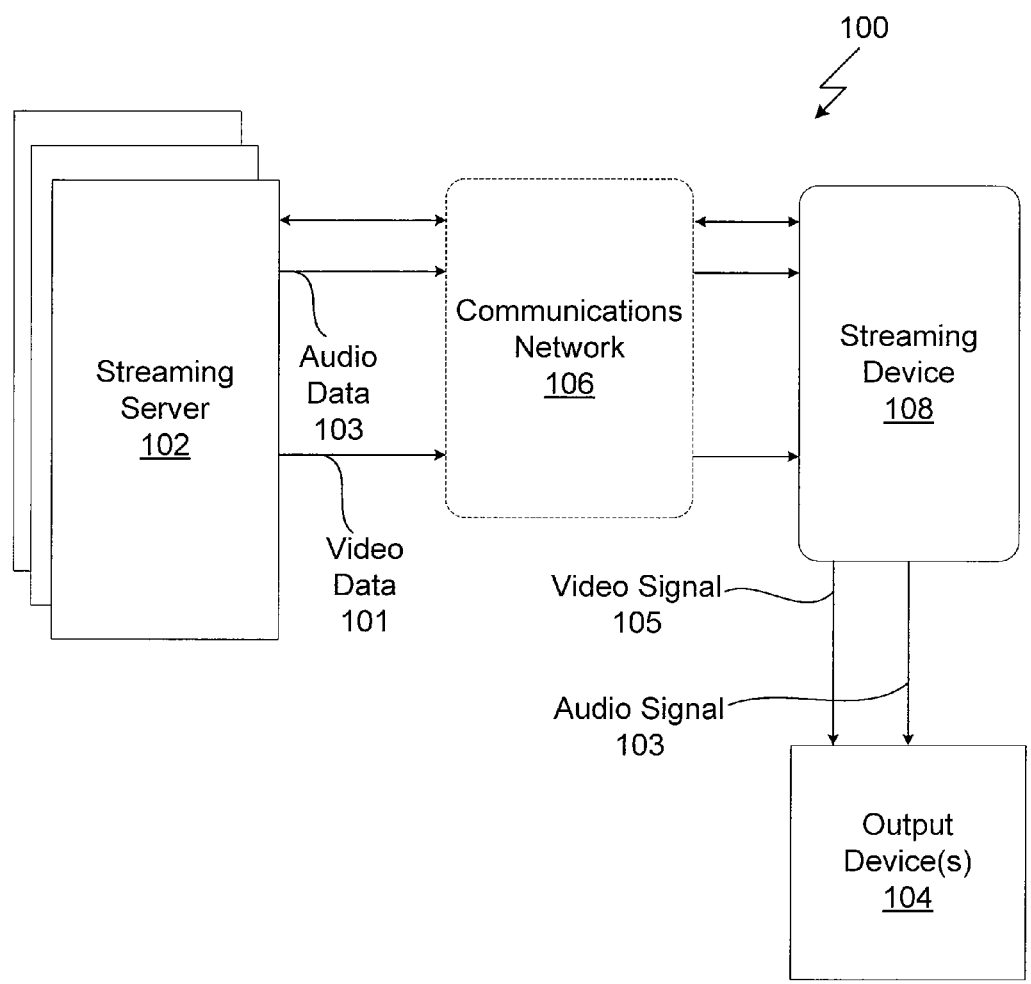
FIG. 1 illustrates a content distribution system configured to implement one or more aspects of the present invention.

FIG. 1 illustrates a content distribution system 100 configured to implement one or more aspects of the invention. As shown, the content distribution system 100 includes a streaming server 102, a communications network 106, a streaming device 108, and a output device(s) 104. The content distribution system 100 may include a plurality of communications networks 106, such as routers and switches, configured to facilitate data communication between the streaming server 102 and the streaming device 108. The output device(s) 104 is configured to produce a display image and associated sound and is typically directly coupled to the streaming device 108 by a wired or wireless connection. Persons skilled in the art will recognize that many technically feasible techniques exist for transmitting data between the streaming server 102, the streaming device 108 and the output device(s) 104, including technologies practiced in deploying the well-known internet communications network.

The streaming server 102 is a computer system configured to encode video and/or audio streams associated with digital media content files for streaming. The content distribution system 100 maybe include one or more streaming servers 102, where each streaming server 102 is configured to perform all the functions needed to encode the video and/or audio streams or where each streaming server 102 is configured to perform a particular function needed to encode the video and/or audio streams. The digital media content files including the encoded video and audio streams are retrieved by the streaming device 108 via the communications networks 106 for output to the output device(s) 104.

As shown in FIG. 1, audio data 103 and video data 101 represent the encoded audio and video streams that are transmitted from the streaming server 102 to the streaming device 108. The streaming device 108 passes the audio data 103 through to the output device 104 as the audio signal 103, unless the audio data 103 is protected. The audio signal 103 is unchanged when compared with the audio data 103 except to remove any padding bits added by the streaming server 102. When the audio data 103 is protected, i.e., encrypted, the output device 104 decrypts the audio data 103 before outputting the decrypted audio data to the output device 104.

When the video data 101 is protected, the video data 101 is first decrypted by the streaming device 108. The decrypted video data may then be uncompressed (if in a compressed format) or decoded into raw frames or PCM (pulse code modulated) intervals and output by the streaming device 108 to the output device(s) 104 as video signal 105. The output device(s) 104 may include a display device and speaker device for presenting video image frames, and generating acoustic output, respectively.

The streaming server 102 comprises one or more computer systems configured to serve download requests for digital media content files from the streaming device 108. The digital media content files may reside on a mass storage system accessible to the computer system. The mass storage system may include, without limitation, direct attached storage, network attached file storage, or network attached block-level storage. The digital media content files may be formatted and stored on the mass storage system using any technically feasible technique. A data transfer protocol, such as the well-known hyper-text transfer protocol (HTTP), may be used to download digital media content files from wherever the digital media content files are stored to the streaming device 108.

The streaming device 108 may comprise a computer system, a set top box, a mobile device such as a mobile phone, or any other technically feasible computing platform that has network connectivity and is coupled to or includes the output device(s) 104. The streaming device 108 is configured for streaming, i.e., to download units of a video stream encoded to a specific playback bit rate. In one embodiment, the streaming device 108 is configured to switch to downloading subsequent units of a video stream encoded to a different playback bit rate based on prevailing bandwidth conditions within the communications network 106. As bandwidth available within the communications network 106 becomes limited, the streaming device 108 may select a video stream encoded to a lower playback bit rate. As the bandwidth increases, a video stream encoded to a higher playback bit rate may be selected. The audio stream is typically a much lower playback bit rate than the corresponding video stream and is therefore not typically encoded at different playback bit rates.

Although, in the above description, the content distribution system 100 is shown with one streaming device 108, persons skilled in the art will recognize that the architecture of FIG. 1 contemplates only an exemplary embodiment of the invention. Other embodiments may include any number of streaming device 108. Thus, FIG. 1 is in no way intended to limit the scope of the present invention in any way.

Figure 2:
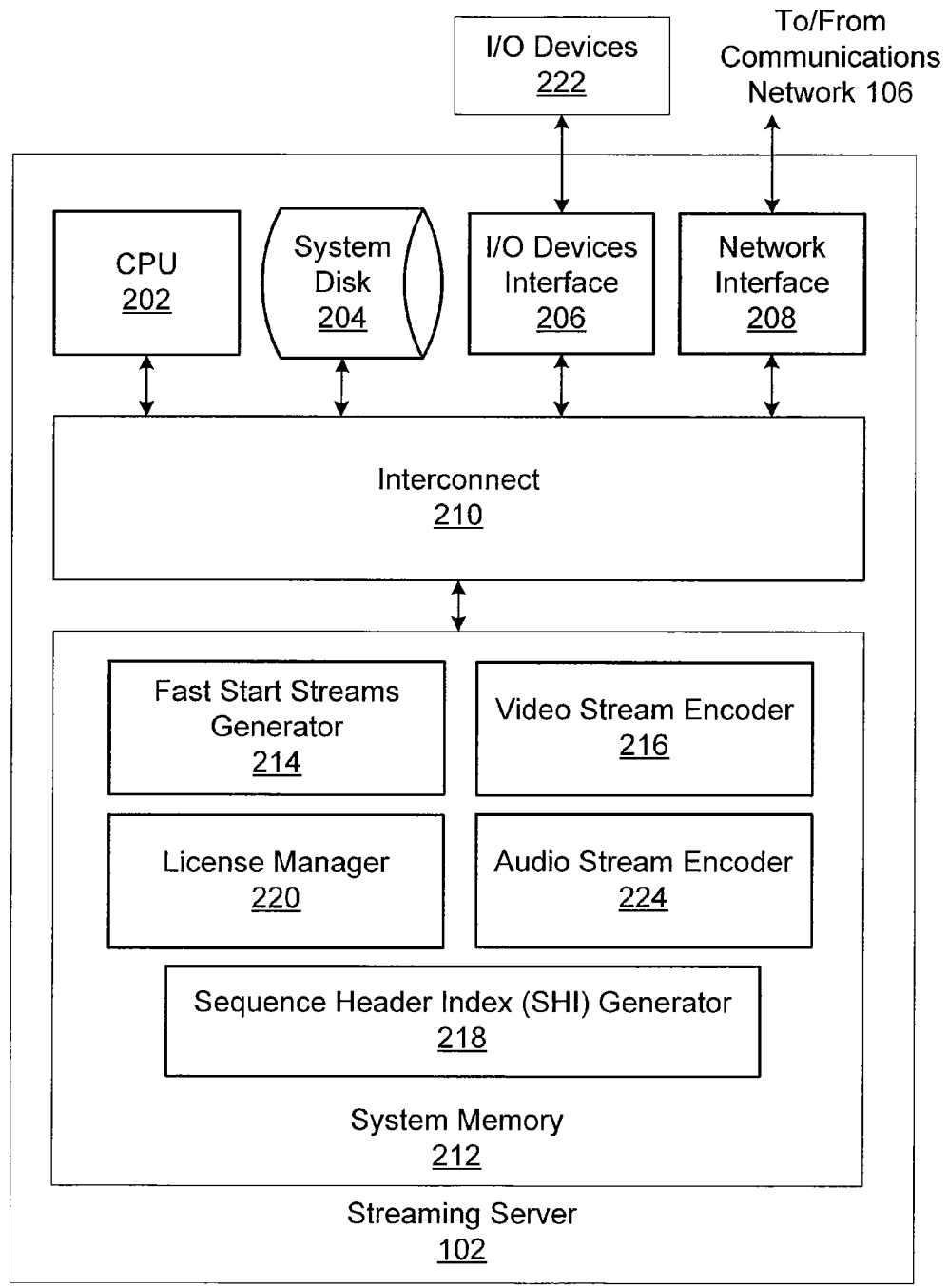
FIG. 2 is a more detailed view of the streaming device of FIG. 1, according to one embodiment of the invention.

FIG. 2 is a more detailed view of the streaming server 102 of FIG. 1, according to one embodiment of the invention. As shown, the streaming server 102 includes a central processing unit (CPU) 202, a system disk 204, an input/output (I/O) devices interface 206, a network interface 208, an interconnect 210 and a system memory 212.

The CPU 202 is configured to retrieve and execute programming instructions stored in the system memory 212. Similarly, the CPU 202 is configured to store application data and retrieve application data from the system memory 212. The interconnect 210 is configured to facilitate transmission of data, such as programming instructions and application data, between the CPU 202, the system disk 204, I/O devices interface 206, the network interface 208, and the system memory 212. The I/O devices interface 206 is configured to receive input data from I/O devices 222 and transmit the input data to the CPU 202 via the interconnect 210. For example, I/O devices 222 may comprise one or more buttons, a keyboard, and a mouse or other pointing device. The I/O devices interface 206 is also configured to receive output data from the CPU 202 via the interconnect 210 and transmit the output data to the I/O devices 222. The system disk 204, such as a hard disk drive or flash memory storage drive or the like, is configured to store non-volatile data such as encoded video streams. The encoded video streams can then be retrieved by the streaming device 108 via the communications network 104. The network interface 218 is coupled to the CPU 202 via the interconnect 210 and is configured to transmit and receive packets of data via the communications network 104. In one embodiment, the network interface 208 is configured to operate in compliance with the well-known Ethernet standard.

The system memory 212 includes software components that include instructions for encoding one or more audio and video streams associated with a specific content title for streaming. As shown, these software components include an fast start streams generator 214, a video stream encoder 216, an audio stream encoder 224, a sequence header index (SHI) generator 218, and a license manager 220.

The video stream encoder 216 executes encoding operations for encoding a video stream to a specific playback bit rate such that the encoded video stream complies with a particular video codec standard, such as VC1, and is configured for streaming. In an alternative embodiment, the video stream can be encoded to comply with a different video codec standard such as MPEG or H.264. In operation, for a particular video stream, the video stream encoder 216 encodes the video stream to different constant bitrates to generate multiple encoded video streams, each encoded video stream associated with a different constant bitrate and, thus, having a different quality. An encoded video stream generated by the video stream encoder 216 includes a sequence of groups of pictures (GOPs), each GOP comprising multiple image frames of video data. In practice, a GOP may include multiple scenes or portions of a scene. A GOP typical corresponds to 2.5 seconds or 10 seconds of playback time, although other durations may also be used. A GOP is specific to video data and one or more GOPs are included in an interval. For each interval of video data, there may be a corresponding interval of audio data. The video and audio streams each include a sequence of intervals.

The SHI generator 218 generates a sequence header index associated with each encoded video stream. To generate the sequence header index, the SHI generator 218 first searches the encoded video stream for the key frames associated with the different intervals included in the encoded video stream. The key frames can be located by the SHI generator 218 based on the sequence start codes specified in the sequence headers included in the key frames. For the interval associated with each of the identified key frames, the SHI generator 218 defines a switch point within the sequence header index that stores (i) a data packet number that identifies the data packet that includes the key frame associated with the interval and (ii) the playback offset associated with the interval. Again, the playback offset associated with the interval is determined based on the location of the interval in the sequence of intervals included in the encoded video stream.

The audio stream encoder 224 executes encoding operations for encoding an audio stream to a specific playback bit rate such that the encoded audio stream is configured for streaming and synchronization with the video stream. The sequence header indexes associated with each encoded video stream that are generated by the SHI generator 218 are also associated with the encoded audio stream. The switch points defined by the SHI generator 218 within the sequence header index stores (i) a data packet numbers that identifies the data packet for the audio data corresponding to each interval of the audio and video data and (ii) the playback offset in the audio data associated with each interval of the audio data.

The audio stream encoder 224 and the video stream encoder 216 are configured to generate encoded audio and video streams that are protected, respectively, e.g., encrypted, ciphered, and the like. In contrast, the fast start streams generator 214 is configured to generate encoded audio and video streams that are not protected. In one embodiment, fast start streams may be generated by the fast start streams generator 214 for a preview clip corresponding to a pivotal moment in a movie. When a preview clip is selected for playback, the fast start streams may be quickly retrieved and played by the streaming device 108. The user may initiate transfer of the protected digital media content while viewing the unprotected digital media content for the same title. Alternatively, the fast start streams may encode the beginning intervals of the protected content. The fast start streams may be precomputed by the streaming server 102 or may be generated on-the-fly, i.e., in real-time, by the streaming server 102 when adequate computation resources are available.

The license manager 220 serves requests for licenses associated with protected streams, e.g., encrypted digital content files, received from the streaming device 108. In operation, protected streams transmitted by the streaming server 102 to the streaming device 108 must be decrypted before the digital media content can be played. The license associated with the protected streams is stored in the streaming server 102 and is transmitted to the streaming device 108, which in turn uses the license to decrypt the protected streams. In one embodiment the license manager 220 functionality may be performed by a license server that is separate from the streaming server 102.

Figure 3:
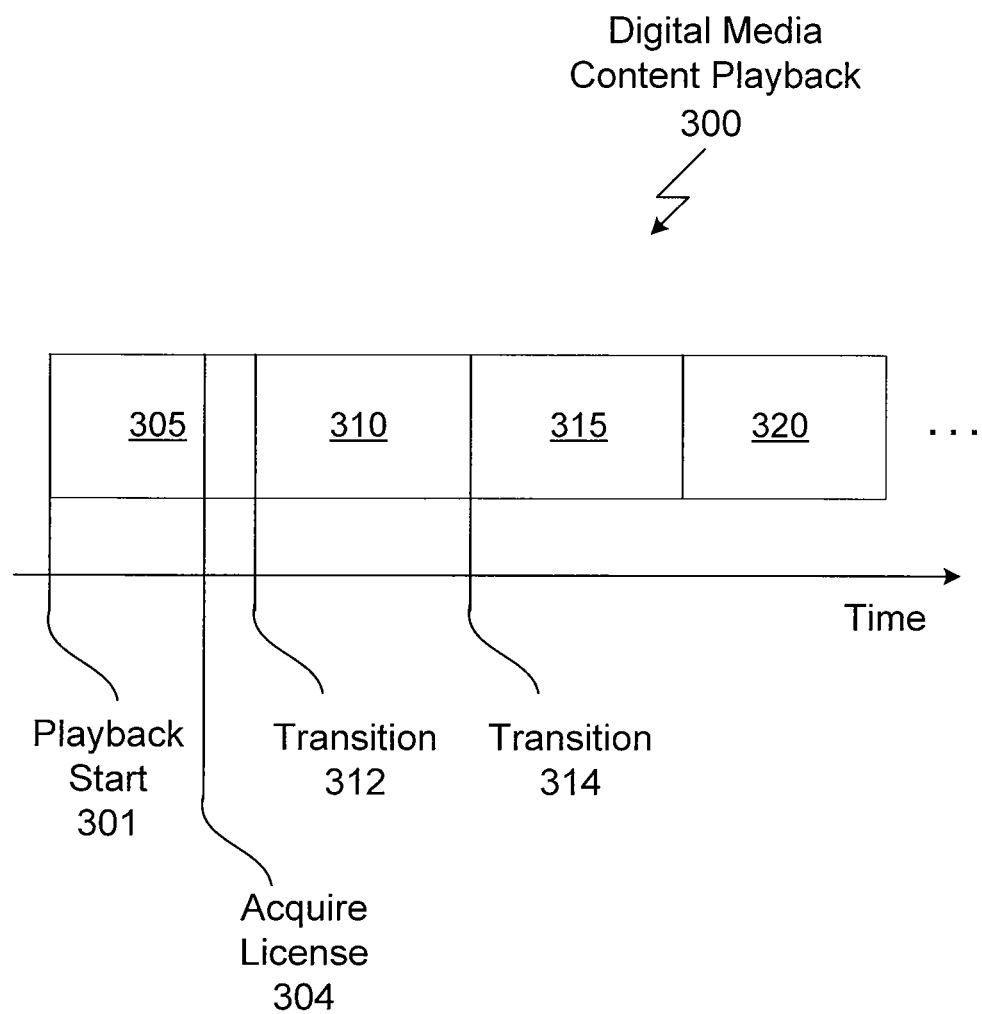
FIG. 3 is an illustration of a transition from fast start streams, generated by the fast start streams generator of FIG. 2, to protected streams after a license is acquired, according to one embodiment of the invention.

FIG. 3 is an illustration of a transition from fast start streams generated by the fast start streams generator 214 of FIG. 2 to protected streams after a license is acquired, according to one embodiment of the invention. The fast start streams only encode a portion of the protected streams for a digital media content title, such as a preview clip or a few seconds or minutes of the beginning of the digital media content title. At the playback start 301 the streaming device 108 retrieves and begins playing an interval 305 from the fast start streams. The streaming device 108 transitions from the fast start streams to the protected streams at any interval boundary after acquiring the license and retrieving, decrypting, and decoding at least one interval of the protected streams.

Alternatively, the streaming device 108 may retrieve and play the entire fast start streams before transitioning to the protected streams, regardless of when the license is acquired. In that case, playback of the protected streams begins at the interval that follows the last interval of the fast start streams, assuming that at least one interval of the protected streams is available for playback, i.e., received, decrypted, and decoded. When at least one interval of the protected streams is not available for playback or if the license has not been acquired after all of the fast start streams intervals are played, then the streaming device 108 may be configured to wait, displaying the last image frame encoded in the video data of the fast start streams.

As shown in FIG. 3, the streaming device 108 acquires the license at acquire license 304 which is during playback of interval 305. A corresponding interval of the fast start streams is played for interval 305. If, at least one interval of the protected streams has been received and is ready to be played by the streaming device 108 at the end of playback of the interval 305, then the streaming device 108 transitions from playing the fast start streams to the protected streams at the transition 312 and the interval 310 may be a corresponding interval of the protected stream. If, at least one interval of the protected streams has not been received or is not ready to be played by the streaming device 108 at the end of the interval 305, then the interval 310 is a corresponding interval of the fast start streams.

Similarly, interval 315 and/or 320 is a corresponding interval of the protected streams if at least one interval of the protected streams has not been received or is not ready to be played by the streaming device 108 at the end of the interval 310 and/or 315, respectively. When at least one interval of the protected streams corresponding to the interval 310 has been received and is ready to be played by the streaming device 108 at the end of the interval 310, then the streaming device 108 transitions from playing the fast start streams to the protected streams at the transition 314. Note that the transitions 312 and 314 occur at an interval boundary between intervals 305 and 310 and intervals 310 and 315, respectively.

The audio stream of the protected streams or fast start streams provides the clock track for synchronous playback of the audio and video streams. Therefore, switching from one audio stream to another audio stream, such as switching from the fast start streams to the protected streams, is only possible when the different audio streams are encoded to have the same playback time intervals and the same playback offsets. The streaming device 108 may be configured to switch between different encoded audio streams and between different encoded video streams.

When generating the fast start streams and the protected streams, the streaming server 102 may generate multiple encoded video streams associated with the same content title and encoded to different playback bit rates. The encoding process implemented by the streaming server 102 ensures that, across the different encoded video and audio streams the intervals are associated with the same playback time interval and that corresponding intervals across the different encoded video and audio streams are associated with the same playback offsets. Therefore, each switch point defined in a sequence header included in one of the encoded video stream associated with a specific content title has a corresponding switch point defined in a sequence header included in each of the other encoded video stream associated with the same content title. Similarly, when multiple encoded audio streams are generated, the audio data corresponding to the interval are associated with the same playback time interval and the same playback offsets. The streaming device 108 may switch between different encoded video streams based on the interval boundaries defined by the corresponding sequence header indices. Importantly, in order to properly switch between the different audio streams, the switch points defined by the SHI generator 218 within the sequence header index for the audio streams are matching in terms of time duration, bytes, and indices.

Figure 4A:
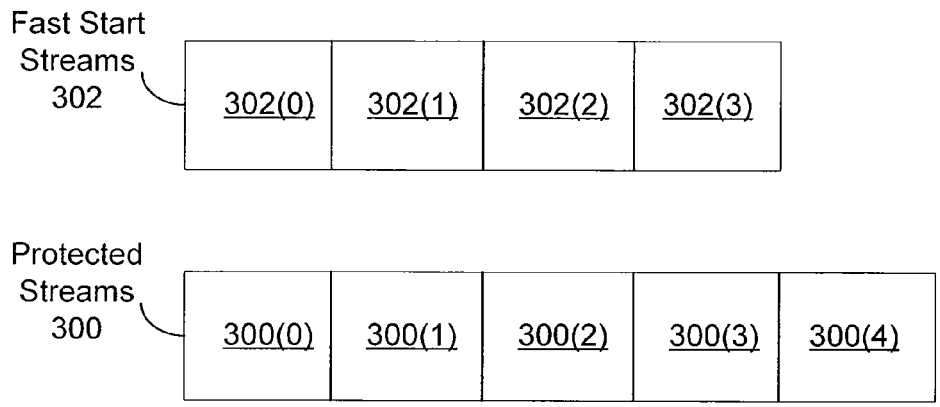
FIG. 4A is an illustration of the protected streams and the fast start streams encoded using fixed rate audio intervals, according to one embodiment of the invention.

FIG. 4A is an illustration of the protected streams 300 and the fast start streams 302 encoded using fixed rate audio intervals by the streaming server 102 of FIGS. 1 and 2, according to one embodiment of the invention. The fast start streams 302 only encode a portion of the protected streams 300, such as a preview clip or a few seconds or minutes of the beginning of the digital media content title. For a portion of the intervals of the protected streams 300, intervals 302(0), 302(1), 302(2), and 302(3), are generated to produce the fast start streams 302. Intervals 302(0), 302(1), 302(2), and 302(3) of the fast start streams 302 correspond to intervals 300(0), 300(1), 300(2), and 300(3) of the protected streams 300. Fast start streams intervals 302(1), 302(2), and 302(3), are subsequent to interval 302(0) in the interval fast start streams 302. In one embodiment, the fast start streams generator 214 precomputes the fast start streams 302. In another embodiment, the fast start streams generator 214 computes the fast start streams 302 on-the-fly when the corresponding content is requested by the streaming device 108.

Because a fixed rate encoding is performed, each interval is of equal and constant length in terms of bytes and playback duration. Video data and audio data may both be encoded using constant bit rates to generate the fast start streams 300 having different constant bit rates for the same content and to generate the protected streams 300 having different constant bit rates for the same content. Typically, intervals of the fast start streams 302 are encoded using a lower bit rate compared with the corresponding intervals of the protected streams 300 so that the intervals of the fast start streams 302 may be quickly retrieved by the streaming device 108.

The streaming device 108 can efficiently transition between the fast start streams 302 and the protected streams 300 by identifying the appropriate switch points in the sequence header indices. When switching between a currently playing encoded audio stream and a different encoded audio stream, the streaming device 108 searches the sequence header index included in the different encoded audio stream to locate the particular switch point specifying the playback offset associated with the next interval to be played. The streaming device 108 can then switch to the new encoded audio stream and download the interval stored in the data packet specified at the particular switch point for playback. For example, for encoded video streams where each interval was associated with a playback time interval of three seconds, if the first interval associated with the playback offset of zero seconds were currently being played, then the next interval to be played would be associated with the playback offset of three seconds. In such a scenario, the streaming device 108 searches the sequence header associated with the new encoded stream for the particular switch point specifying a playback offset of three seconds. Once locating the particular switch point, the streaming device 108 would download the interval stored in the data packet specified in the switch point for playback.

Figure 4B:
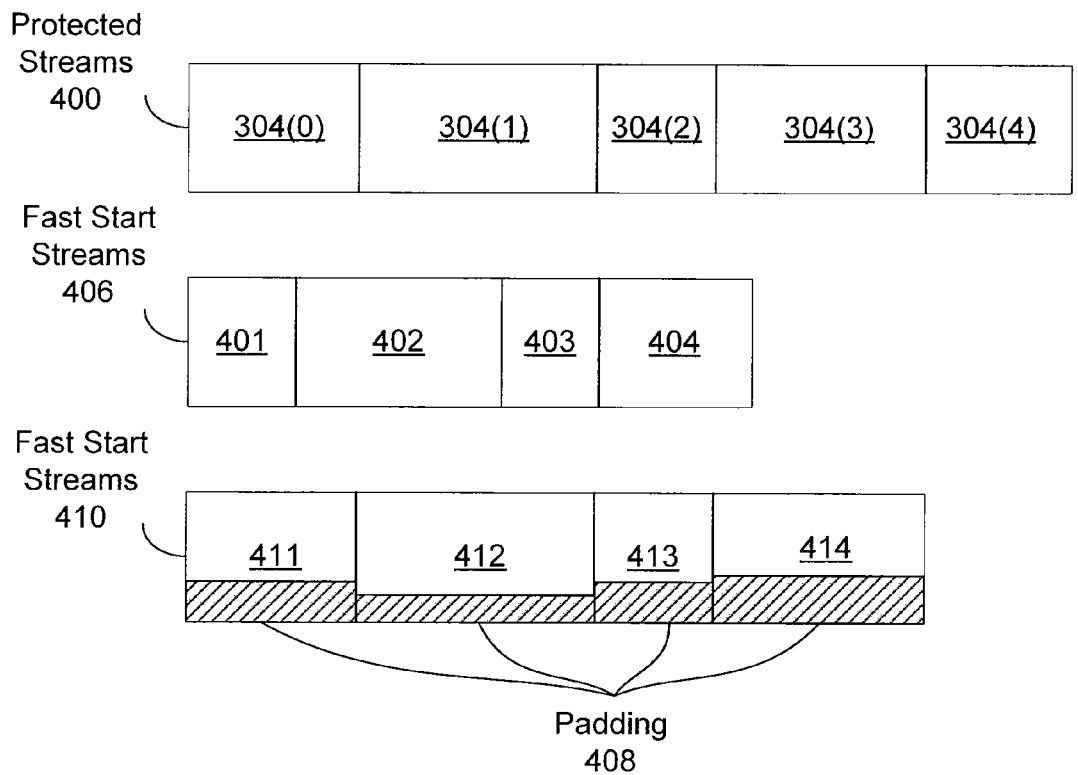
FIG. 4B is an illustration of the protected streams and the fast start streams encoded using variable rate intervals, according to one embodiment of the invention.

FIG. 4B is an illustration of protected streams 400 and fast start streams 406 encoded using variable bit rate (VBR) intervals, according to one embodiment of the invention. Rather than encoding the video and audio streams at a fixed bit rate, each interval is encoded based on the content for the respective interval. For example, interval for a scene of low complexity is encoded to a lower bit rate to "save" bits for scenes having a higher complexity. The average bit rate across a VBR video stream is, thus, not reflective of the bit rate of a particular interval within the VBR video stream.

The VBR encoded protected streams 400 includes intervals 304(0), 304(1), 304(2), 304(3), and 304(4) corresponding to intervals 300(0), 300(1), 300(2), 300(3), and 300(4) of the protected streams 300, respectively. The fast start streams 406 is the VBR encoding of the fast start streams 302. Intervals 401, 402, 403, and 404 are the VBR encoded intervals 302(0), 302(1), 302(2), and 302(3), respectively. Note that the interval boundaries are not aligned between the protected streams 400 and the fast start streams 406 due to the VBR encoding. Therefore, the switch points between corresponding intervals in the streams are different and the streaming device 108 cannot easily locate corresponding intervals in the different streams. In order to easily switch between the different streams, the switch points defined by the SHI generator 218 within the sequence header index for the streams match in terms of time duration, bytes, and indices.

The fast start streams 410 includes VBR encoded intervals that match the intervals in the VBR encoded protected streams 400 in terms of time duration, bytes, and indices. Intervals 411, 412, 413, 414, and 415 are the encoded intervals 411, 412, 413, and 414 correspond to intervals 304(0), 304(1), 304(2), and 304(3) of the VBR encoded protected streams 400, respectively. The intervals 411, 412, 413, and 414 may be generated by including padding 408 compared with the corresponding intervals 401, 402, 403, and 404 to match the length in bytes of the corresponding intervals of the protected streams 400, e.g., intervals 304(0), 304(1), 304(2), and 304(3). The streaming device 108 may easily locate corresponding intervals in the protected streams 400 and the fast start streams 410 in order to switch between the audio data and/or the video data included in the two streams at any interval boundary.

Prior to initiating playback, the streaming device 108 may measure available bandwidth from the content server and select a digital media content file having a bit rate that can be supported by the measured available bandwidth. To maximize playback quality, a digital media content file with the highest bit rate not exceeding the measured bandwidth is conventionally selected. To the extent the communications network 106 can provide adequate bandwidth to download the selected digital media content file while satisfying bit rate requirements, playback proceeds satisfactorily. In practice, however, available bandwidth in the communications network 106 is constantly changing as different devices connected to the communications network 106 perform independent tasks.

To counter the variability of network conditions, adaptive streaming may be implemented where, for each title, multiple video streams having different fixed bit rates exist. As the network conditions vary, the streaming device 108 may switch between video streams according to the network conditions. For example, video data may be downloaded from video streams encoded to higher fixed bit rates when the network conditions are good, and, when the network conditions deteriorate, subsequent video data may be downloaded from video streams encoded to lower fixed bit rates. The bit rate of the audio stream is typically much lower than the bit rate of the video stream, so the audio stream is typically only encoded for a single fixed bit rate. Because the bit rate for a particular interval of a VBR encoded video stream is not fixed, adaptive stream is best suited for use with fixed bit rate streams.

Figure 5A:
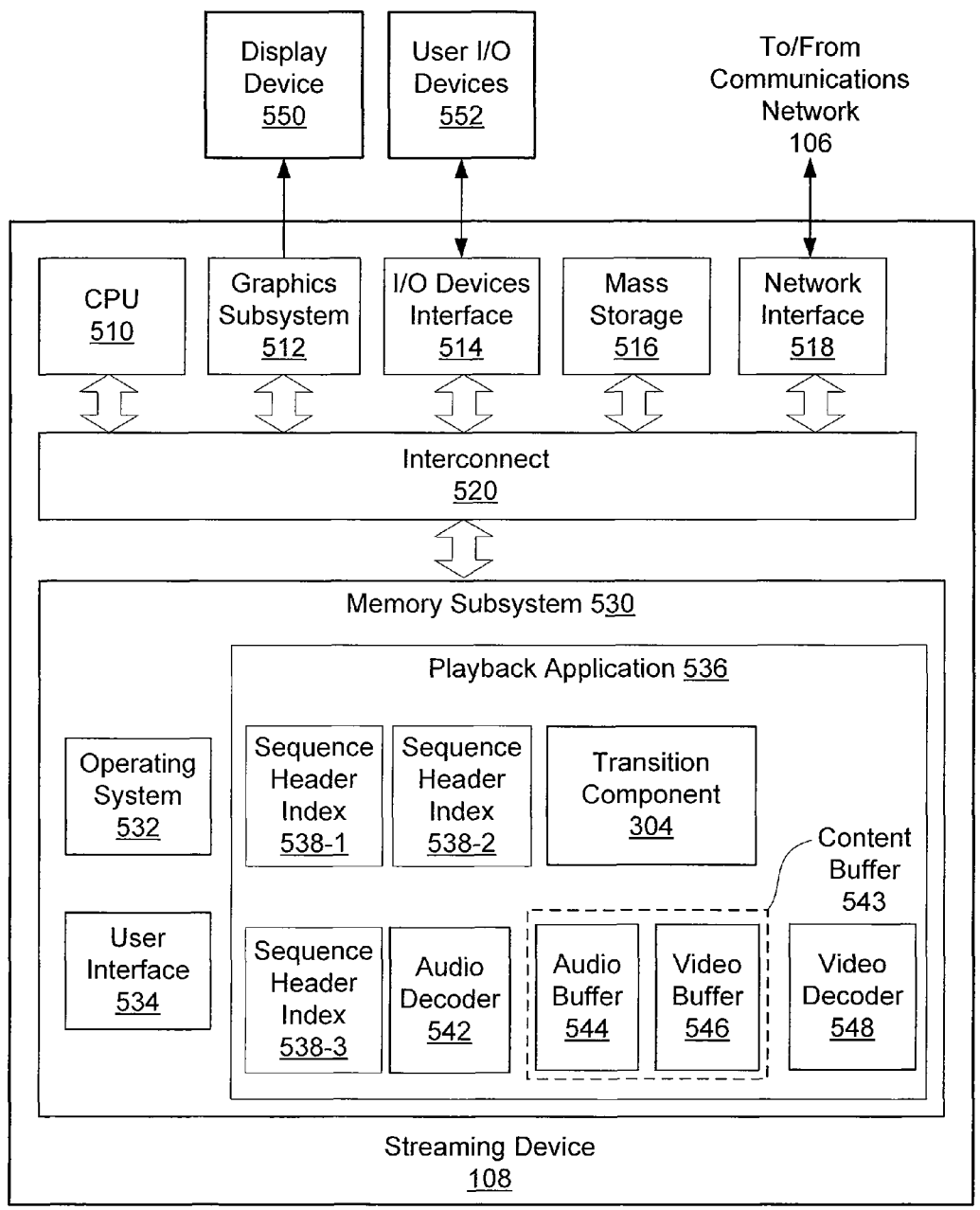
FIG. 5A is a more detailed view of the streaming device of FIG. 1, according to one embodiment of the invention.

FIG. 5A is a more detailed view of the streaming device 108 of FIG. 1, according to one embodiment of the invention. As shown, the streaming device 108 includes, without limitation, a central processing unit (CPU) 510, a graphics subsystem 512, an input/output (I/O) device interface 514, a network interface 518, an interconnect 520, and a memory subsystem 530. The streaming device 108 may also include a mass storage unit 516.

The CPU 510 is configured to retrieve and execute programming instructions stored in the memory subsystem 530. Similarly, the CPU 510 is configured to store and retrieve application data residing in the memory subsystem 530. The interconnect 520 is configured to facilitate transmission of data, such as programming instructions and application data, between the CPU 510, graphics subsystem 512, I/O devices interface 514, mass storage 516, network interface 518, and memory subsystem 530.

The graphics subsystem 512 is configured to generate image frames of video data and transmit the frames of video data to display device 550. In one embodiment, the graphics subsystem 512 may be integrated into an integrated circuit, along with the CPU 510. The display device 550 may comprise any technically feasible means for generating an image for display. For example, the display device 550 may be fabricated using liquid crystal display (LCD) technology, cathode-ray technology, and light-emitting diode (LED) display technology (either organic or inorganic). An input/output (I/O) device interface 514 is configured to receive input data from user I/O devices 552 and transmit the input data to the CPU 510 via the interconnect 520. For example, user I/O devices 552 may comprise one of more buttons, a keyboard, and a mouse or other pointing device. The I/O device interface 514 also includes an audio output unit configured to generate an electrical audio output signal. User I/O devices 552 includes a speaker configured to generate an acoustic output in response to the electrical audio output signal. In alternative embodiments, the display device 550 may include the speaker. A television is an example of a device known in the art that can display video frames and generate an acoustic output. A mass storage unit 516, such as a hard disk drive or flash memory storage drive, is configured to store non-volatile data. A network interface 518 is configured to transmit and receive packets of data via the communications network 106. In one embodiment, the network interface 518 is configured to communicate using the well-known Ethernet standard. The network interface 518 is coupled to the CPU 510 via the interconnect 520.

The memory subsystem 530 includes programming instructions and data that comprise an operating system 532, user interface 534, and playback application 536. The operating system 532 performs system management functions such as managing hardware devices including the network interface 518, mass storage unit 516, I/O device interface 514, and graphics subsystem 512. The operating system 532 also provides process and memory management models for the user interface 534 and the playback application 536. The user interface 534 provides a specific structure, such as a window and object metaphor, for user interaction with streaming device 108. Persons skilled in the art will recognize the various operating systems and user interfaces that are well-known in the art and suitable for incorporation into the streaming device 108.

The playback application 536 is configured to retrieve digital media content, e.g., audio and video streams, from the streaming server 102 via the network interface 518 and play the digital media content through the graphics subsystem 512. The graphics subsystem 512 is configured to transmit a rendered video signal to the display device 550. In normal operation, the playback application 536 receives a request from a user to play a specific digital media content title. The playback application 536 then identifies the different encoded video streams associated with the requested digital media content title, wherein each encoded video stream is encoded to a different playback bit rate. A preview clip may be encoded separately from the requested title or may be indicated by an index into the video and audio streams encoded for the requested title.

After the playback application 536 has located the encoded video streams associated with the requested title, the playback application 536 downloads sequence header indices associated with each encoded video stream associated with the requested title from the streaming server 102. As previously described herein, a sequence header index associated with an encoded video stream includes information related to the encoded sequence included in the digital media content file.

In one embodiment, the playback application 536 begins downloading the digital media content file associated with the requested title comprising the encoded sequence encoded to the lowest playback bit rate to minimize startup time for playback. For the purposes of discussion only, the digital media content file is associated with the requested title and comprises the encoded sequence encoded to the lowest playback bit rate. The requested digital media content file is downloaded into the content buffer 543, configured to serve as a first-in, first-out queue. In one embodiment, each unit of downloaded data comprises a unit of video data or a unit of audio data. As units of video data associated with the requested digital media content file are downloaded to the streaming device 108, the units of video data are pushed into the content buffer 543. Similarly, as units of audio data associated with the requested digital media content file are downloaded to the streaming device 108, the units of audio data are pushed into the content buffer 543. In one embodiment the units of video data are stored in video buffer 546 within the content buffer 543, and units of audio data are stored in audio buffer 544, also within the content buffer 543.

A video decoder 548 reads units of video data from the video buffer 546, and renders the units of video data into a sequence of video frames corresponding in duration to the fixed span of playback time. Reading a unit of video data from the video buffer 546 effectively de-queues the unit of video data from the video buffer 546 (and from the content buffer 543). When the video data is encrypted, the video decoder 548 decrypts the video data using the license provided by the license manager 220. The sequence of video frames is processed by graphics subsystem 512 and transmitted to the display device 550.

An audio decoder 542 reads units of audio data from the audio buffer 544, and processes the units of audio data into a sequence of audio samples, generally synchronized in time with the sequence of video frames. When the audio data is encrypted, the audio decoder 542 decrypts the audio data using the key provided by the license manager 220. In one embodiment, the sequence of audio samples is transmitted to the I/O device interface 514, which converts the sequence of audio samples into the electrical audio signal. The electrical audio signal is transmitted to the speaker within the user I/O devices 552, which, in response, generates an acoustic output.

Given the bandwidth limitations of the communications network 106, the playback application 536 may download consecutive portions of video data from different constant bit rate encoded video streams based on available bandwidth. Other performance factors that may influence the specific encoded stream from which to download the portion of video data include the buffer size of the video buffer 546, the behavior of the end-user viewing the video content, the type of display being generated (high-definition, standard-definition, etc) and the available lead time. These factors combined with the bandwidth limitations of the communications network 106 may be used to determine a specific encoded video stream from which to download each interval of the video data.

The transition component 304 receives content playback information including the content title selection and request for a license to play the protected version of the content title. Typically a portion of a content title, such as a preview, may be played without acquiring the license, but the license is needed to play the full digital media content for the title. The transition component 304 determines which streams are retrieves, requests the license, and controls transitions between different streams. The sequence header indexes 538-1, 538-2, and 538-3 are each associated with a respective video or audio stream and are used by the transition component 304 to locate switch points defined by the SHI generator 218 within each stream. The transition component 304 may switch from playing a first audio and/or video stream at an interval boundary to playing a second audio and/or video stream.

Figure 5B:
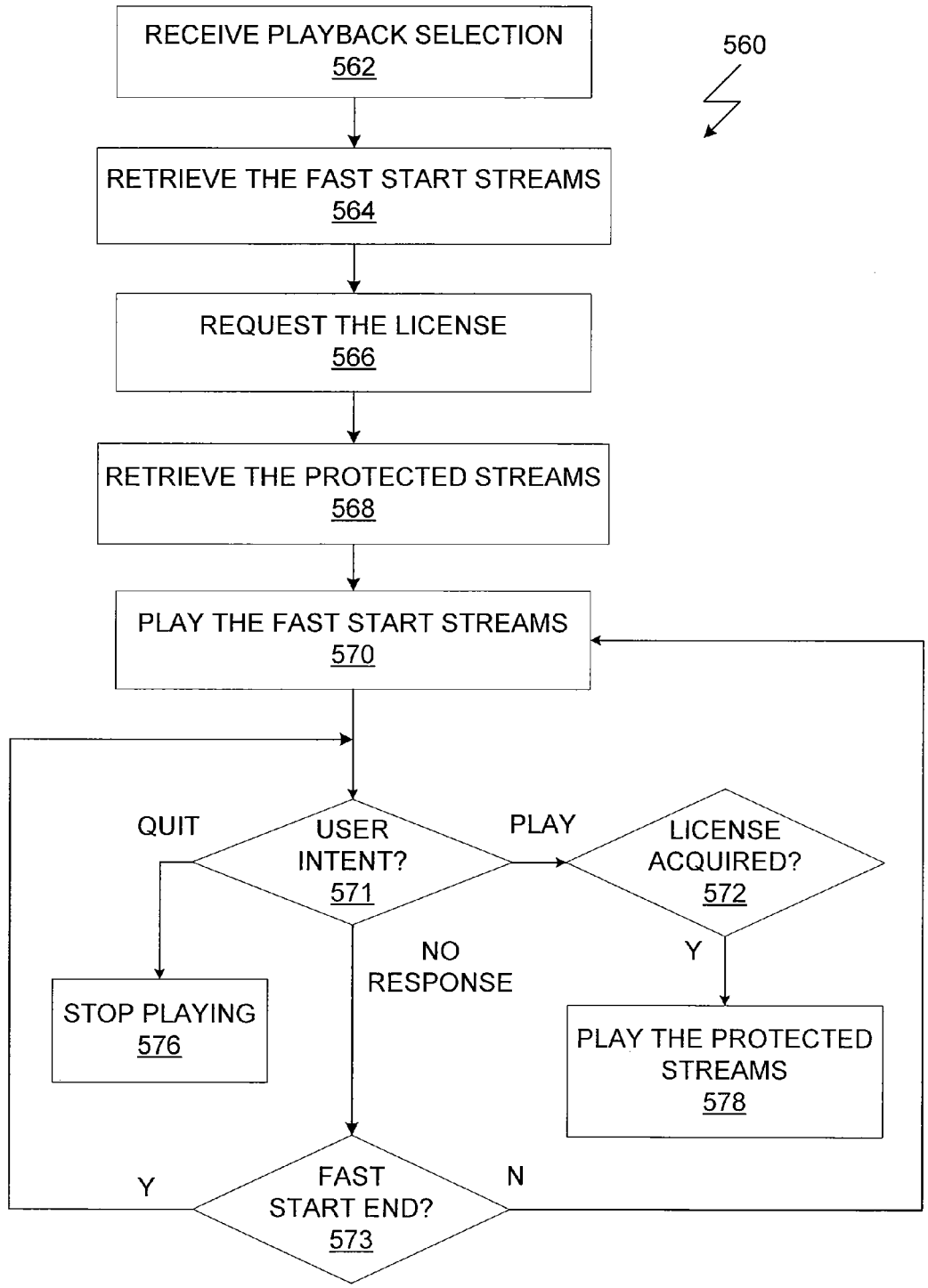
FIG. 5B is a flow diagram of method steps for transitioning from playing fast start streams to playing protected streams after a license for protected digital media content is requested and acquired, according to one embodiment of the invention.

FIG. 5B is a flow diagram 560 of method steps for playing the fast start streams 302 or the fast start streams 410 and transitioning to the protected streams 300 or 400, respectively, according to one embodiment of the invention. Although the method steps are described in conjunction with the systems for FIGS. 1, 2 and 5A, persons skilled in the art will understand that any system configured to perform the method steps, in any order, is within the scope of the invention.

At step 562, the playback application 536 receives a playback selection indicating the digital media content for which playback has been initiated. The playback selection may be for a preview clip of the digital media content or for playback of the protected digital media content. At step 564, the playback application 536 initiates retrieval of one or more intervals from the fast start streams 302 or 410. At step 566, the playback application 536 requests the license for the digital media content.

At step 568, the playback application 536 initiates retrieval of one or more intervals from the protected streams 300 or 400. At step 570, the playback application 536 begins playing the intervals from the fast start streams 302 or 410 in sequence. At step 571, the playback application determines if the user intent is to quit playing the unprotected digital media content or switch from playing the unprotected digital media content to play the protected digital media content. The user intent may be determined by first presenting the user with an interface including "play" and "quit" buttons or symbols that represent "play" and "quit" functions. The user may choose not to provide a response, in which case the playback application 536 proceeds to step 573 from step 571.

If, at step 571 the playback application 536 determines that the user intent is to quit, then at step 576 the playback application 536 stops playing the unprotected digital media content. If, at step 571 the user intent cannot be determined because no response has been received from the user, then at step 573 the playback application 536 determines if the end of the fast start streams 302 or 410 is reached, i.e., all of the intervals in the fast start streams 302 or 410 have been played. If at step 573 the end of the fast start streams 302 or 410 is not reached, then the playback application 536 returns to step 570 to continue playing the fast start streams 302 or 410. Otherwise, the playback application 536 returns to step 571.

If, at step 571, the user intent is determined to be to play the protected digital media content, then at step 572 the playback application 536 determines if the license for the digital media content is acquired. If, at step 571 the playback application 536 determines that the license for the digital media content has not been acquired, then the playback application 536 waits for the license for the digital media content is acquired before proceeding to step 578. At step 578 the playback application 536 transitions (or switches) from playing the fast start streams 302 or 410 to playing the protected streams 300 or 400. Importantly, the playback application 536 transitions at an interval boundary when at least one interval of the protected streams 300 or 400 is available (received, decrypted, and decoded). In one embodiment, the playback application 536 may be configured to transition from playing the fast start streams 302 or 410 to playing the protected streams 300 or 400 after the last interval of the fast start streams 302 or 410 has been played, so that all of the intervals in the fast start streams 302 or 410 are played before the protected streams 300 or 400 are played. In one embodiment, the request for the license at step 566 and retrieval of the protected streams 300 or 400 at step 568 may be performed after step 571 in response to determining the user intent is to play the protected digital media content.

In order to select a specific encoded video stream from a set of fixed bit rate encoded video streams representing the same video data, the playback application 536 executing on the streaming device 108 may be configured to dynamically determine the encoding level (high, medium, or low bit rate) of the video stream for the next portion of the video data to be downloaded during playback of a different (previous) portion of the digital media content.

One advantage of the disclosed technique is that the perceived delay between the time a user selects the protected digital media content to when playback of the protected digital media content begins is reduced because retrieval and playback of the fast start streams starts before the license and protected version of the digital media content is received. The fast start streams of audio and video data that may encoded at a lower bit rate than the protected version in order to quickly transfer the fast start streams from the content server to the playback device. The fast start streams may encode a preview clip of the protected content and the user may initiate transfer of the protected digital media content while viewing the unprotected digital media content for the same title. Alternatively, the fast start streams may encode the beginning intervals of the protected content.

In one embodiment of the invention the streaming device 108 comprises an embedded computer platform such as a set top box. An alternative embodiment of the invention may be implemented as a program product that is downloaded to a memory within a computer system, for example as executable instructions embedded within an internet web site. In this embodiment, the streaming device 108 comprises the computer system.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A method for deferred license retrieval when starting to stream digital media content, the method comprising:
    receiving a playback selection for a digital media content title;
    retrieving one or more intervals of a fast start data stream comprising a sequence of intervals that encode an unprotected portion of data of the digital media content title;
    requesting a license for the digital media content title that authorizes playback of a protected data stream comprising a sequence of intervals that encode protected portions of the data of the digital media content title;
    playing at least one of the one or more intervals of the fast start data stream before the license for the digital media content title is acquired;
    determining that the license for the digital media content title has been acquired; and
    in response, transitioning to the protected data stream by playing a first interval of the protected data stream immediately after playing a second interval included in the one of the one or more intervals of the fast start data stream, wherein a starting interval boundary of the first interval and an ending interval boundary of the second interval correspond to substantially the same playback offset within the digital media content title.

2. The method of claim 1, further comprising retrieving one or more of the intervals of the protected data stream.

3. The method of claim 2, further comprising:
    acquiring the license for the digital media content title while playing the one or more intervals of the fast start data stream; and
    in response, switching from playing the one or more intervals of the fast start data stream to playing in sequence the intervals of the protected data stream.

4. The method of claim 2, further comprising decrypting each interval of the protected data stream as the interval of the protected data stream is received.

5. The method of claim 1, wherein the unprotected portion of the video data and the audio data of the digital media content title comprises a preview clip of the digital media content title.

6. The method of claim 1, further comprising determining a user intent is to play the protected data stream while playing the at least one of the one or more intervals of the fast start data stream.

7. The method of claim 1, wherein a bit rate associated with the fast start data stream is less than a bit rate associated with the protected data stream.

8. The method of claim 1, wherein the unprotected portion of the data and the protected portion of the data includes video data and audio data.

9. The method of claim 1, wherein the unprotected portion of data of the digital media content title comprises a beginning portion of the digital media content title.

10. A non-transitory computer-readable storage medium storing instructions that, when executed by a processor, cause the processor to defer license retrieval when starting to stream digital media content, by performing the steps of:
    receiving a playback selection for a digital media content title;
    retrieving one or more intervals of fast start data stream comprising a sequence of intervals encoding an unprotected portion of data of the digital media content title;
    requesting the license for the digital media content title, wherein the license authorizes playback of a protected data stream comprising a sequence of intervals encoding protected data of the digital media content title;
    playing at least one of the one or more intervals of the fast start data stream before the license for the digital media content title is acquired;
    determining that the license for the digital media content title has been acquired; and
    in response, transitioning to the protected data stream by playing a first interval of the protected data stream immediately after playing a second interval included in the one of the one or more intervals of the fast start data stream, wherein a starting interval boundary of the first interval and an ending interval boundary of the second interval correspond to substantially the same playback offset within the digital media content title.

11. The computer-readable storage medium of claim 10, further comprising retrieving one or more of the intervals of the protected data stream.

12. The computer-readable storage medium of claim 11, further comprising:
    acquiring the license for the digital media content title while playing the one or more intervals of the fast start data stream; and in response, switching from playing the one or more intervals of the fast start data stream to playing in sequence the intervals of the protected data stream.

13. The computer-readable storage medium of claim 11, further comprising decrypting each interval of the protected data stream after each interval of the protected data stream is received.

14. The computer-readable storage medium of claim 10, wherein the unprotected portion of the data of the digital media content title comprises a preview clip of the digital media content title.

15. The computer-readable storage medium of claim 10, further comprising determining a user intent is to play the protected data stream while playing the at least one of the one or more intervals of the fast start data stream.

16. The computer-readable storage medium of claim 10, wherein a bit rate associated with the fast start data stream is less than a bit rate associated with the protected data stream.

17. The computer-readable storage medium of claim 10, wherein the unprotected portion of the data and the protected portion of the data includes video data and audio data.

18. The computer-readable storage medium of claim 10, wherein the unprotected portion of data of the digital media content title comprises a beginning portion of the digital media content title.

19. The computer-readable medium of claim 10, wherein transitioning to the protected data stream comprises comparing a first sequence header index of at least one interval included in the one or more intervals of the fast start data stream to a second sequence header index of at least one interval included in the protected data stream to determine that the first interval and the second interval are temporally consecutive portions of the digital media content title.

20. The computer-readable medium of claim 19, wherein the first sequence header index and the second sequence header index comprise at least one of a time, a number of bytes, and an index number.

21. A system for deferred license retrieval when starting to stream digital media content, the system comprising:
   a network interface that is coupled to a communications network and configured to receive the streaming digital media content;
   a memory configured to store a playback application; and
   a processor that is coupled to the memory and configured to execute the playback application that is configured to:
      receive a playback selection for a digital media content title;
      retrieve one or more intervals of a fast start data stream comprising a sequence of intervals that encode an unprotected portion of data of the digital media content title;
      request the license for the digital media content title, wherein the license authorizes playback of a protected data stream comprising a sequence of intervals that encode protected portions of the data of the digital media content title;
      play at least one of the one or more intervals of the fast start data stream before the license for the digital media content title is acquired;
      determine that the license for the digital media content title has been acquired; and
      in response, transition to the protected data stream by playing a first interval of the protected data stream immediately after playing a second interval included in the one of the one or more intervals of the fast start data stream, wherein a starting interval boundary of the first interval and an ending interval boundary of the second interval correspond to substantially the same playback offset within the digital media content title.

22. The system of claim 21, wherein a bit rate associated with the fast start data stream is less than a bit rate associated with the protected data stream.

* * * * *